117,949

UNITED STATES PATENT OFFICE.

DAVID WIHL, OF BROOKLYN, NEW YORK, ASSIGNOR OF ONE-FOURTH HIS RIGHT TO HENRY WEHLE, OF NEW YORK CITY.

IMPROVEMENT IN PROCESSES OF MANUFACTURING CAST-STEEL TOOLS, &c.

Specification forming part of Letters Patent No. 117,949, dated August 8, 1871.

*To all whom it may concern:*

Be it known that I, DAVID WIHL, of Brooklyn, county of Kings and State of New York, have invented a new and Improved Method of Making Cast-Steel Tools and Wares and Converting Wrought-Iron to Steel; and I do hereby declare the following to be a full, clear, and exact description of my said invention.

To enable others skilled in the art to which my invention refers to make and use the same, I will proceed to describe it.

I forge the tools or other articles which I purpose to manufacture out of common wrought-iron. The articles so made are subjected to two successive treatments or processes. The first I call the purifying process. The object of the first process is to purify the iron of deleterious foreign substances which are mostly found, sometimes in greater sometimes in smaller quantities, in the iron. These foreign substances are sulphur and phosphorus, and exist in the iron in chemical combination. The object of the second process is to convert the iron, purified of its deleterious substances, into steel, by adding to and equalizing the carbon contained in the purified iron in chemical combination.

The first process is as follows. I prepare a powder of the following substances: Two parts of wrought-iron filings, six parts common clay, three parts silicon, two parts oxide of iron, one part peroxide of iron, one-half part manganese, one part carbonate of lime, one part carbonate of magnesia, one part saltpeter, one-half part common salt. These substances are pulverized and intermixed so as to form one uniform dry powder. The forged tools or articles are bestrewn with this powder and immersed in, so that the powder shall come in contact with every side and groove thereof. According to the thickness of the article I subject the same, immersed in said powder and crucibles of the ordinary construction contained, to a steady white heat during a period from one to eight days. This I can do in common kilns or horizontal or vertical furnaces of construction as those used for melting steel or brass. No exact ratio of thickness of the articles and length of time required for the heating thereof can be specified, but the exact time required for every specific article must be left to the practical experience of the operator—plates of the thickness of an eighth of an inch or less are subjected to the heat during eight to ten hours, and plates or articles of greater thickness in about this proportion. This first process reduces any carbon which may be contained in the iron in mechanical combination, and carries the same off in the form of carbonic acid, carbonate of hydrogen, and other carbon combinations, and carries off or evaporates the other foreign deleterious substances—sulphur and phosphorus—by the formation of sulphuric and phosphorous acids and gases. The object which this first process accomplishes, besides reducing the deleterious foreign substances in the iron contained, is to impregnate the iron with silicon and nitrogen.

After the tools or articles have been purified by this first process they are subjected to the second process, which is only a repetition of the first process in every respect, except that a powder composed of different materials—viz., six parts carburet of iron, four parts black ivory, two parts charcoal, three parts yellow cyanide of potassium, one part saltpeter, one-half part common salt, two parts cast-iron filings—is employed. These substances are pulverized, intermixed with each other so as to form a uniform homogeneous dry powder, and applied to the castings in the manner as above under the specification of the first process described. After the required heating of the castings and subsequent gradual cooling, they will be found to possess all the qualities and characteristics of superior cast-steel. In the course of the second process or treatment the carbon of the iron is increased, the compound containing carbon in great abundance, but all carbon added combines with the iron in chemical combination.

I claim as my invention, and desire to secure by Letters Patent of the United States—

1. The process for converting wrought-iron forged in wares or articles, retaining the original form of the articles, by first purifying the iron of its foreign deleterious substances and then impregnating the same with carbon, silicon, and nitrogen.

2. The compound of carburet of iron, black ivory, charcoal, yellow cyanide of potassium, saltpeter, common salt, and cast-iron filings, or ingredients containing substantially the same elements in substantially the same proportions as herein described, used for converting wrought-iron into steel, substantially as herein described, and for the purpose mentioned.

DAVID WIHL.

Witnesses:
HENRY WEHLE,
HENRY FUEHRER.